United States Patent [19]

Bower

[11] 4,246,150
[45] Jan. 20, 1981

[54] LUBRICANT FOR HEAT PROCESSING OF VINYL CHLORIDE RESINS

[75] Inventor: J. David Bower, Somerville, N.J.

[73] Assignee: American Hoechst Corporation, Somerville, N.J.

[21] Appl. No.: 76,524

[22] Filed: Sep. 17, 1979

[51] Int. Cl.³ .............................................. C08L 91/00
[52] U.S. Cl. ................................ 260/28.5 D; 106/270; 260/28.5 A; 264/211
[58] Field of Search ..................... 106/270; 264/211; 260/28.5 D, 28.5 A

[56] References Cited

U.S. PATENT DOCUMENTS

| | | | |
|---|---|---|---|
| 2,541,987 | 2/1951 | Cramer | 260/32.8 A |
| 3,442,837 | 5/1969 | Brotz et al. | 260/23 X |
| 3,756,990 | 9/1973 | Jaeger et al. | 528/309 |
| 3,780,140 | 12/1973 | Hammer | 260/28.5 A V |
| 3,979,347 | 9/1976 | Brotz et al. | 260/28.5 D |
| 4,002,706 | 1/1977 | Pretorius | 260/28.5 D |
| 4,132,691 | 1/1979 | Ejk | 260/28.5 D |

*Primary Examiner*—Melvyn I. Marquis
*Attorney, Agent, or Firm*—Michael J. Tully

[57] ABSTRACT

A lubricant composition useful as a heat processing aid for vinyl chloride resin compositions is disclosed. The lubricant composition comprises a mixture of about 5 to 95% by weight of an ethylene polymer wax having an average molecular weight in the range of about 1,000 to 10,000, about 5 to 20% by weight of a waxy oxygen-containing ethylene polymer having an acid number in the range of about 10 to 150, and about 0 to 90% by weight of a paraffin wax. The lubricant composition is most effective when blended with the vinyl chloride resin composition at levels within the range of about 0.5 to 3.0 parts per 100 parts resin.

11 Claims, No Drawings

LUBRICANT FOR HEAT PROCESSING OF VINYL CHLORIDE RESINS

BACKGROUND OF THE DISCLOSURE

The present invention relates to an improved lubricant composition useful as a processing aid for vinyl chloride polymer compositions.

Lubricants must be employed to improve the flow characteristics and reduce sticking of vinyl chloride polymer compositions processed by extrusion, injection molding, or calendaring. Some of the most commonly employed lubricants include low molecular weight monocarboxylic acids having 8 to 18 carbon atoms, salts of these acids and esters of these acids with aliphatic alcohols having 2 to 24 carbon atoms. Most popular of this category is stearic acid and calcium stearate. Polyethylene having a molecular weight in the range of about 3,000 to 20,000 is taught in U.S. Pat. No. 3,442,837 as a lubricant for polyvinyl chloride (PVC), used either alone or in combination with one of the aforementioned fatty acids or fatty acid derivatives. Furthermore, the use of oxidized polyethylene as a PVC lubricant is taught in U.S. Pat. No. 3,979,347. U.S. Pat. No. 3,862,066 suggests combinations of different lubricants such as paraffin wax and/or calcium stearate blended with oxidized polyethylene.

In some applications lubricant systems containing fatty acids or fatty acid esters are not suitable. For example, the fatty acids and their salts have a tendency to exude from PVC during processing and storage. This is not particularly desirable in those cases where the PVC is extruded into piping materials intended to transport edible liquids or powders, or for packaging applications. It is found that other lubricants such as polyethylene, ethylene polymers containing oxygen, and fatty acid esters require excessive amounts of energy input for extrusion and the PVC does not process easily without the presence of an additional lubricant such as calcium stearate. Increasing the use levels of these lubricants often helps processing, but at the cost of a negative effect on the physical properties of the processed PVC composition. Thus, the skilled compounder often requires a lubricant system which will not exude from the processed resin, will not seriously affect the physical properties of the processed product, will provide good flow properties during processing and will require a minimum amount of extruder energy input thereby allowing for lower processing temperatures and good production rates.

Accordingly, it is an object of this invention to provide a balanced multifunctional lubricant system for heat processing of vinyl chloride polymer compositions.

Another object is to provide a lubricant system for extruded polyvinylchloride which allows the resin to be extruded using less work or input energy and accordingly gives rise to higher production rates.

SUMMARY OF THE INVENTION

These and other objects of the invention may be achieved by providing a lubricant composition comprising a mixture of about 5 to 95% by weight of an ethylene polymer wax having an average molecular weight in the range of about 1,000 to 10,000, about 5 to 20% by weight of a waxy oxygen-containing ethylene polymer having an acid number in the range of about 10 to 150, and about 0 to 90% by weight of a paraffin wax. The lubricant composition is most effective when blended with the vinyl chloride resin composition at levels within the range of about 0.5 to 3.0 parts per 100 parts resin.

Vinyl chloride resin compositions containing the lubricant system of this invention are found to extrude with good flow control, a minimum of sticking and the extruded material exhibits good surface characteristics and physical properties. Most significantly, however, the amount of work required for extrusion as measured by the number of amps drawn by the extruder while running and the pressure at the die head is markedly reduced as compared with other lubricant systems. This allows for faster rates of extrusion and increased productivity.

DETAILED DESCRIPTION OF THE INVENTION

The term oxygen-containing ethylene polymer refers to waxy homopolymers and copolymers containing a major amount of polymerized ethylene which have been chemically combined with oxygen either by means of oxidation of the polymeric backbone or by copolymerization of ethylene monomer with at least one oxygen-containing comonomer, such that the oxygen-containing ethylene polymer has an acid number in the range of about 10 to 150 and a molecular weight in the range of about 1,000 to 10,000. Such polymers may be prepared as more fully described below by the oxidation of polyethylene or of copolymers of ethylene with up to 30% by weight of one or more alpha olefins containing from 3 to 8 carbon atoms, for example, propylene, butene-1, pentene-1, heptene-1 and the like. Suitable waxy polymers may also be prepared by forming copolymers of ethylene with minor amounts of carbon monoxide, i.e., from about 3 to 30% by weight, such as disclosed in U.S. Pat. No. 2,541,987, or by forming terpolymers of ethylene with less than about 50% by weight of a carbon monoxide and a third monomer selected from the group consisting of vinylacetate, methylmethacrylate, vinyl proprionate and like monomers containing carboxy groups. Such terpolymers and their method of manufacture are disclosed in U.S. Pat. No. 3,780,140.

oxidized ethylene polymer waxes which may be employed in the lubricant composition of this invention may be obtained by treating a dispersion of a wax-like polyethylene or copolymer of ethylene with a different alpha olefin having a molecular weight in the range of about 1,000 to 10,000 and a preferred density in the range of about 0.92 to 1.01 g/cm$^3$ with oxygen or an oxygen containing gas, usually in the presence of a free radical catalyst and under pressure and elevated temperature. The oxidation process may be stopped by interrupting the flow of oxygen or by adding antioxidants when the desired acid number is achieved. A process for preparing such oxidized waxes suitable for the purposes of this invention is described in U.S. Pat. No. 3,756,999, the disclosure of which is incorporated herein by reference. Particularly suitable are oxidized polyethylenes having an acid number in the range of about 10 to 150 as measured by (ASTM No. D-1386). Blends of two or more oxidized polyethylenes having low and high acid numbers within this range may also be used. Preferably the oxidized component has an acid number in the range of about 15 to 50 and an average molecular weight of about 2,000 to 7,000.

The non-oxidized ethylene polymer wax component of the blend is a medium to hgh density material having an average molecular weight in the range of about 1,000 to 10,000 and preferred density in the range of about 0.92 to 0.98 g/cm$^3$. The waxy ethylene polymer may be polyethylene or copolymers of ethylene with up to 30% by weight of an alpha olefin having from 3 to 8 carbon atoms, for example, propylene, butene-1, pentene-1, hexene-1, heptene-1, 3-methyl-butene-1, 4-methyl-pentene-1, and the like. The most significant advantages in terms of ease of extruder processing come about using polyethylene having an average molecular weight below about 5,000, preferably between 1,500 to 5,000.

The paraffin wax component which may be present in the blend is mixture of solid linear aliphatic hydrocarbons of generally high average molecular weight, e.g., above about 300, but less than about 1,000. These materials generally exhibit a specific gravity in the range of about 0.88 to 0.92 and a melting point of about 47°–65° C.

The combination of the oxidized and non-oxidized waxy ethylene polymers in the lubricant appear to provide a unique interraction when used as a lubricant for processing rigid vinyl chloride resin compositions, providing lubrication both internal, i.e., within the resin and external, i.e., between the resin and confines of the processing apparatus. Accordingly, conventional internal lubricants such as calcium stearate can be eliminated without the necessity of including larger than desirable amounts of other waxes or paraffins or external lubricants to compensate. Thus, use of a lubricant system based on a two component blend comprising about 5 to 20% by weight of oxygen-containing ethylene polymer and correspondingly about 80 to 95% by weight of non-oxidized ethylene polymer results in a homogeneous vinyl chloride resin melt which does not stick to extrusion equipment and can be processed with less input work as compared, for example, with a lubricant containing no non-oxidized ethylene polymer. Inclusion of from about 5 to 90% by weight of paraffin wax further enhances the ease of processing, as will be shown below. Optimum extrusion properties are found using a lubricant system containing a mixture of about 10% by weight of oxidized polyethylene, about 5 to 45% by weight non-oxidized polyethylene and correspondingly about 45 to 85% by weight of paraffin wax.

Vinyl chloride resins which may be beneficially processed according to this invention are those well known materials which may be heat formed to provide useful shaped articles, such as by calendering, injection molding or extrusion. These include polyvinyl chloride or polyvinylidene chloride and copolymers or terpolymers of vinyl chloride with minor amounts of different comonomers such as vinylidene chloride, vinyl acetate and other copolymerizable monomers. These resinous compositions may also contain other well known additives such as pigments, fillers, heat stabilizers and the like.

As indicated above, the lubricant may be employed at a level generally within the range of 0.5 to 3.0 parts per 100 parts vinyl chloride resin. In most cases the lubricant is found quite effective at a level in the range of 1.0 to 2.0 parts per 100 parts resin. The resin, lubricant and any other ingredients may be mixed prior to heat processing or forming by any method which will insure as homogeneous a mixture as possible, e.g., by dry mixing the ingredients in solid flake or powder form, by forming a homogeneous melt, or by metering in the additives in a mixer/extruder.

In the following examples, identical blends having the following approximate composition were made in a high shear mixer:
polyvinyl chloride resin ... 100 parts
lubricant ... 1.2–1.5 parts
heat stabilizer ... 0.4 parts
titanium dioxide ... 1.0 parts
filler (calcium carbonate) ... 3.0 parts The resin and stabilizer were added at room temperature, the mixer was started and the mixture was heated. When the temperature reached 70° C., the filler and TiO$_2$ were added. At 80° C., the mixed lubricant composition was added and mixing continued. The blended composition was removed from the mixer and allowed to cool to room temperature before extrusion.

The extruder employed is a conical 50/25 mm. twin screw extruder. The screws are oil heated and counter rotating. A standard one inch pipe die head was employed. The temperature profile in the extruder for all runs was screw about 160° C., barrel zones about 170° to 180° C., and die zone of about 190° C.

In Examples 1–6, polyvinyl choride compositions having the above formulation were prepared and extruded under the above referenced conditions. The composition of the lubricants employed in these examples is as indicated in Table 1. The OXPE (oxidized polyethylene) used was a material having an acid number in the range of 25 to 35, a saponification number in the range of 40–60, an average molecular weight of about 5,000, and a density in the range of 0.98 to 1.00 g/ml. The PE (non-oxidized polyethylene) had an average molecular weight of about 2,000 and a density in the range of 0.93 to 0.94 g/ml. All formulations were extruded under identical conditions. The running amperage drawn by the extruder and the pressure measured at the restrictor between the tip of the screw and die head was recorded for each Example. Results are shown in Table 1.

TABLE 1

|  |  | Ex. 1 | Ex. 2 | Ex. 3 | Ex. 4 | Ex. 5 | Ex. 6 |
|---|---|---|---|---|---|---|---|
| Lubricant: | % OXPE | 10 | 10 | 10 | 10 | 10 | 10 |
|  | % PE | 0 | 10 | 20 | 40 | 70 | 90 |
|  | % Paraffin | 90 | 80 | 70 | 50 | 20 | 0 |
|  | Extruder Amps: | 7.0 | 4.7 | 4.1 | 4.5 | 5.0 | 5.4 |
|  | Pressure (Kg/cm$^2$) | 305 | 200 | 160 | 150 | 150 | 150 |

As is evident from Table 1, more work and higher pressures were encountered in extruding PVC where the lubricant system was composed only of OXPE and paraffin. The lowest amperage and acceptable pressures were exhibited with the formulations of Examples 2–4.

In Examples 7–12, Examples 1–6 were repeated under the same extrusion conditions with the exception that the non-oxidized polyethylene employed in these examples had an average molecular weight of 3,000 and a density of 0.96. The lubricant was used at a level of 1.2 parts per 100 parts resin. Results are shown in Table 2.

TABLE 2

|  |  | Ex. 7 | Ex. 8 | Ex. 9 | Ex. 10 | Ex. 11 | Ex. 12 |
|---|---|---|---|---|---|---|---|
| Lubricant: | % OXPE | 10 | 10 | 10 | 10 | 10 | 10 |
|  | % PE | 0 | 10 | 20 | 40 | 70 | 90 |
|  | % Paraffin | 90 | 80 | 70 | 50 | 20 | 0 |
|  | Extruder Amps: | 6.7 | 4.4 | 4.2 | 4.2 | 4.6 | 5.6 |

TABLE 2-continued

|  | Ex. 7 | Ex. 8 | Ex. 9 | Ex. 10 | Ex. 11 | Ex. 12 |
|---|---|---|---|---|---|---|
| Pressure (Kg/cm$^2$): | 235 | 195 | 165 | 167 | 142 | 200 |

In Examples 13–16, a non-oxidized polyethylene having an average molecular weight of about 9,000 and a density in the range of 0.94 to 0.96 was substituted for the non-oxidized polyethylene of Examples 1–6, and the PVC composition was extruded the same way. Results are shown in Table 3.

TABLE 3

|  |  | Ex. 13 | Ex. 14 | Ex. 15 | Ex. 16 |
|---|---|---|---|---|---|
| Lubricant: | % OXPE | 10 | 10 | 10 | 10 |
|  | % PE | 0 | 10 | 20 | 40 |
|  | % Paraffin | 90 | 80 | 70 | 50 |
|  | Extruder Amps: | 6.5 | 5.4 | 6.3 | 7.4 |
|  | Pressure (Kg/cm$^2$) | 260 | 250 | 223 | 200 |

Samples containing 60% or more of the 9,000 molecular weight non-oxidized polyethylene were difficult to extrude because of excess amperage encountered.

The above data demonstrates that the lubricant combination of an oxygen-containing ethylene polymer and non-oxidized ethylene polymer, optionally containing paraffin wax as defined herein, gives rise to certain improved ease of processing when this composition is used as a processing aid for vinyl chloride resin compositions.

What I claim is:

1. A lubricant composition comprising a mixture of:
   (a) 5 to 95% by weight of a waxy ethylene polymer having an average molecular weight in the range of about 1,000 to 10,000;
   (b) 5 to 20% by weight of a waxy oxygen-containing ethylene polymer having an acid number in the range of about 10 to 150 and an average molecular weight in the range of about 1,000 to 10,000; and
   (c) 0 to 90% by weight of paraffin wax.

2. The composition of claim 1 containing at least 5% by weight paraffin wax.

3. The composition of claim 1 wherein the waxy ethylene polymer is polyethylene, having an average molecular weight in the range of about 1500 to 5000.

4. The composition of claim 3 wherein the waxy oxygen-containing ethylene polymer is oxidized polyethylene having an acid number in the range of about 15 to 50.

5. The composition of claim 4 containing from about 45 to 85% by weight paraffin wax.

6. The composition of claim 5 containing from about 5 to 45% by weight polyethylene wax.

7. A vinyl chloride resin composition comprising an intimate mixture of vinyl chloride resin and about 0.5 to 3 parts of the lubricant composition of claim 1 per 100 parts of vinyl chloride resin.

8. A vinyl chloride resin composition comprising an intimate mixture of vinyl chloride resin and about 0.5 to 3 parts of the lubricant composition of claim 4 per 100 parts of vinyl chloride resin.

9. A vinyl chloride resin composition comprising an intimate mixture of vinyl chloride resin and from about 0.5 to 3 parts per hundred parts of vinyl chloride resin of a lubricant composition consisting essentially of:
   (a) 5 to 90% by weight of a polyethylene wax having an average molecular weight in the range of about 1500 to 5000,
   (b) 5 to 20% by weight of an oxidized polyethylene wax having an acid number in the range of about 15 to 50 and an average molecular weight in the range of about 2000 to 7000, and
   (c) 5 to 90% by weight of paraffin wax.

10. A method for heat processing a vinyl chloride resin comprising forming an intimate mixture of a vinyl chloride resin composition and about 0.5 to 3 parts of the lubricant of claim 1, and forming the mixture under heat and pressure to produce a shaped product.

11. The method of claim 10 wherein said forming is extrusion.

* * * * *